United States Patent Office 2,936,893
Patented May 17, 1960

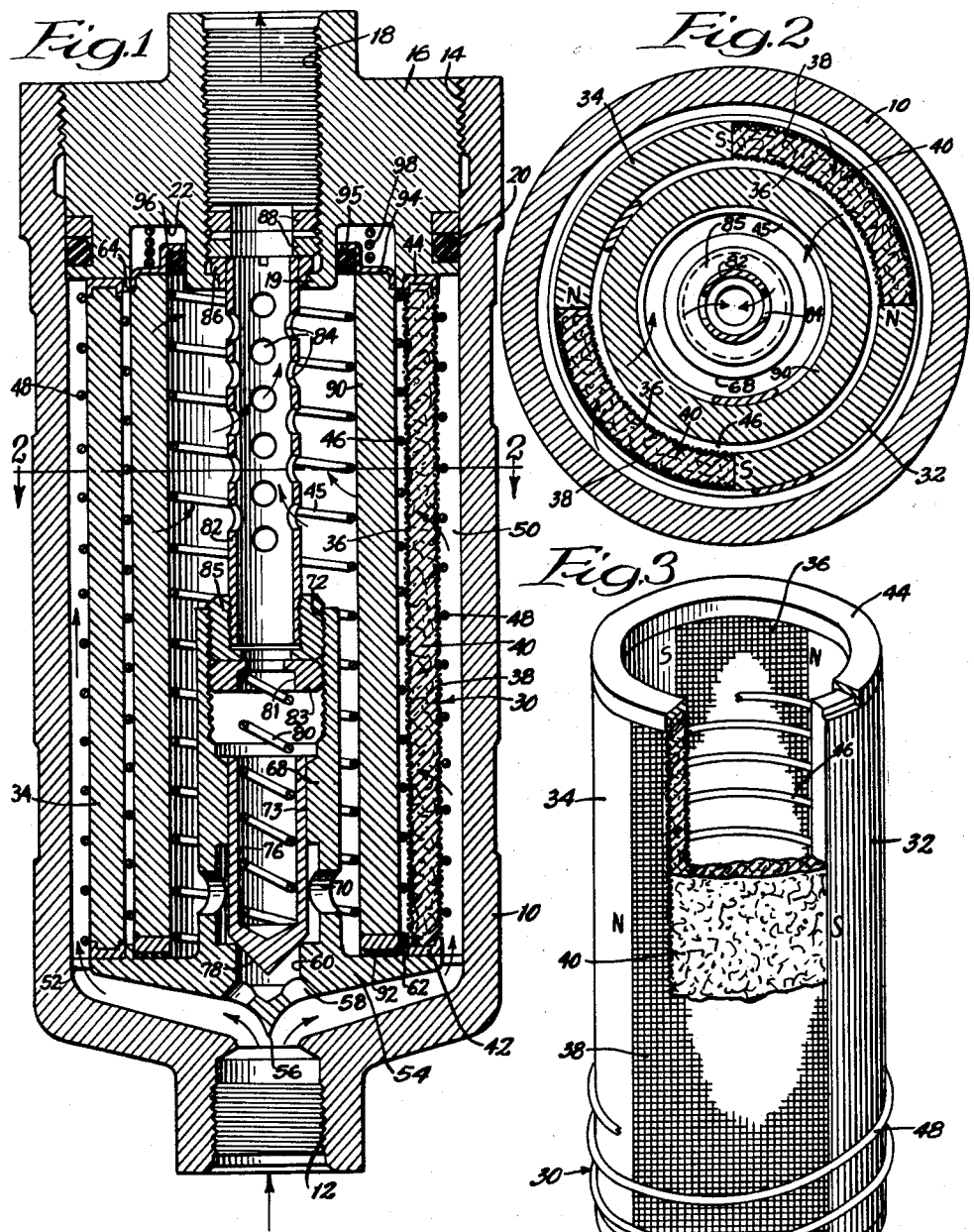

2,936,893

MAGNETIC FILTER

George T. Arkoosh, Seattle, John S. Miller, Issaquah, and Glen D. Cullor, Seattle, Wash., assignors to Wilkinson Manufacturing Company, Omaha, Nebr., a corporation of Nebraska Application April 11, 1958, Serial No. 727,874

12 Claims. (Cl. 210—223)

This invention relates to magnetic filters, and more particularly to an improved filter construction which is capable of efficiently removing contaminants of minute particle size from fluids such as engine oils.

Magnetic filters of various designs have been proposed heretofore for removing finely divided magnetic material from liquid sludges and the like. Generally, these prior art filters comprise a housing which contains a mass of porous magnetizable material disposed within a magnetic field through which the contaminated liquid flows. The magnetic circuit is completed through the housing, thus necessitating that it be made from heavy iron rather than a lightweight non-magnetic material. Further, the porous magnetizable media in prior devices was coarse, e.g. carpet tacks. These devices proved to be satisfactory for filtering relatively large sized contaminants but were woefully inadequate for effectively removing tiny contaminants having a mean diameter of 20 microns or less. To render these devices even partially effective necessitated increasing the length of the flow path through the magnetized media and reducing the volume or rate of fluid flow. Both of these expedients are undesirable since an increase in the size and the weight of the filter restricts its use. In aircraft, for example, it is essential that filters for oils and hydraulic fluids be as light as possible in weight, small in size and thoroughly effective to remove a high percentage of contaminants, including those of extremely small particle size.

It is, therefore, a general object of this invention to provide a magnetic filter having a self-magnetized filter unit housed in a lightweight, non-magnetic casing.

It is another object of this invention to provide a magnetic filter in which the filtering media possesses a very high magnetic flux gradient effective to attract minute ferrous contaminants of extremely low mass, and which does not clog rapidly due to accumulation of foreign material on the external surface of the filter media.

Another object is to provide a combination filter which effectively separates both magnetic and non-magnetic contaminants from fluid flowing therethrough and which utilizes a readily available commercial micronic filter cartridge for separating the non-magnetic contaminants.

According to one feature of the invention, the filter has a non-magnetic cylindrical housing having an inlet and outlet at either end and an annular filter unit axially disposed therein, the unit comprising permanent magnets forming equally-spaced segments of the unit with the gaps separating the magnets being filled with minute magnetizable irregular-shaped particles. This arrangement of magnets and filtering media forms a complete magnetic circuit without additional parts. Therefore, the lightest, most compact filtering element is achieved. The fluid being filtered flows axially through the inlet, radially through the filtering media in the gaps at right angles to the lines of magnetic flux, and then axially through the outlet. In a preferred form, the magnetizable particles are at least small enough to pass through a 40 mesh (ASTM standard) sieve so that the spaces therebetween are sufficiently small to provide a high flux gradient for trapping microscopic contaminants.

Another object is to provide an improved magnetic filter equipped with by-pass means to permit continued circulation of fluid through the filter housing in the event the filter media becomes plugged so that resistance to flow therethrough is increased above a predetermined maximum value.

These and other objects and advantages of our invention will become apparent from the following description when read in conjunction with the accompanying drawing, in which:

Figure 1 is a longitudinal sectional view through a filter constructed in accordance with the invention;

Figure 2 is a transverse sectional view taken along the line 2—2 of Figure 1; and Figure 3 is a perspective view of the filter unit with parts broken away to illustrate the construction of the various elements comprising the unit.

Referring now to the drawings, the housing 10 is a cylinder having one closed or restricted end which terminates in a threaded opening 12. Opening 12 is adapted to receive a pipe through which the fluid being filtered enters the filter. The opposite end of the cylindrical housing 10 is not restricted but is completely open to permit assembling the various elements comprising the internal members of the filter. The outlet end is internally threaded, as indicated at 14, and carries a plug 16 to hold the internal elements in proper position. Plug 16 has a central tapped opening 18 therethrough which serves as an outlet for fluid leaving the filter. The housing 10 and the plug 16 are preferably made from a lightweight non-magnetic material such as aluminum. They may also be made of any other non-magnetic material having the necessary strength and functional requirements. Reinforced plastics, for example, may be suitable for this use. The novel annular filter unit of the invention permits utilization of a non-magnetic material for the housing since it is not a part of the magnetic circuit. To seal the plug 16 and thus prevent any fluid from leaking to the outside of the filter an O-ring 20 made from neoprene or other suitable oil-resistant rubber is provided within a recess in the circumference of the plug 16. The O-ring 20 is compressed against the inner wall of the housing when the plug is screwed into position. The inner face of the plug has an annular groove 22 and an inwardly projecting flange 64 for purposes which will become apparent hereinafter.

The magnetic filter unit which fits in the housing 10 is indicated generally by the numeral 30 and is best illustrated in Figure 3. It consists of two elongated magnets 32 and 34 which comprise opposed quadrants of the cylindrical filter unit. More than two, say four to six or more, equally-spaced magnets may be employed if desired. The magnets are arranged in such a manner that the gaps between unlike poles are less than those between like poles. The alternate quadrants comprising the gaps between the magnets are enclosed with an inner arcuate screen 36 and an outer arcuate screen 38 which may be soldered to the edges of the magnets 32 and 34. The space defined by the side edges of the magnets and the screens is filled with tiny irregular-shaped ferromagnetic particles such as iron filings having passed a standard ASTM 20 mesh screen and having been retained on a 80 mesh ASTM standard screen. Preferably, the particles will pass through a 40 mesh screen and be retained on a 60 mesh screen. In this specification and in the appended claims, the numerical mesh designation is based upon standard ASTM screens. The particles are thus disposed within the magnetic field, each becoming in itself a tiny magnet to establish a magnetic flux gradient across the interstices. The unit forms a complete magnetic circuit in itself.

The size of the magnetizable particles is critical for effective separation of extremely small contaminants. When a contaminant is very small in relation to the interstitial space between the magnetizable particles, the force exerted thereon by the magnetic field is low. Therefore, the magnetized elements or particles disposed within the magnetic field must be closely spaced to provide the necessary magnetic force to capture low-mass impurities. For example, to effectively trap a ferrous impurity having a mean diameter of one micron, this impurity must pass within two or three diameters of the surface of the magnetized particle in the filter media. Its low mass makes the force by which it is attracted to the magnet practically nil. This problem is further complicated by the necessity of keeping the flow path short. The impurities must be trapped during the short interval of travel through the thickness of the filter media. By using the magnet design of this invention with particles having interstitial spaces four to six times the diameter of the contaminants, these difficulties are obviated.

If high efficiency in this range is not required, other porous materials may be used in place of the 20 to 80 mesh iron filings, e.g. knitted steel or iron mesh, steel wool, grids, screens and similar materials.

The filter unit is provided with a pair of helical reinforcing springs 46 and 48 for supporting the inner screen 36 and the outer screen 38, respectively. The pressure within the filter would be likely to distort the screen if it were not suitably reinforced. Both the springs 46 and 48 and the screens 36 and 38 are made of a non-magnetic material such as brass. It is obvious that if these are made of magnetic material, the magnetic flux would be short-circuited through the screen instead of passing through the minute irregular ferrous particles 40 disposed between the screens. Brass retainer rings 42 and 44 having right angle flanges are adapted to fit over the top and bottom edges of the filter unit enclosing the ends to prevent the particles 40 from falling out, and to maintain the geometry of the element.

The filter unit 30 is placed axially within the housing 10 through the open end thereof. The end of the unit 30 adjacent the inlet opening 12 rests upon a cap 54 which has a plurality of ears 52 projecting therefrom which fit the bore of the case 10 to center the element. The opposite end is held in centered position by means of the flange 64 on plug 16, when the plug is in place. The unit 30 is compressed between the cap 54 and the plug 16 so that the retaining rings 42 and 44 are under compression. This prevents fluid from flowing out of the annular space 50 past the ends of the filter unit 30.

The cap 54 is spaced from the inlet end of the housing sufficiently to permit fluid to flow into the filter at the desired rate. The cap 54 carries an integral tubular extension 68 projecting axially toward the outlet end of the filter. The tube 68 serves as a housing for a relief valve, as explained hereinbelow. The surface of the cap which faces the inlet of the filter terminates in a central peak or point 56 concentric with the inlet opening 12. Point 56 slopes downwardly radially toward the edge of the cap and serves to streamline the flow of fluid entering the filter toward the outside walls of the housing. Thus, fluid entering through the inlet 12 flows over the cap 54 which diverts the flow into the annular space 50 between the filter unit 30 and the inner wall of the housing 10. The fluid then flows radially inwardly through the filter media 40 (normal to the general flux path) and subsequently changes its direction and flows axially through the outlet 18. This flow is designated in the drawing by means of arrows.

A plurality of openings 58 surround the point 56 and communicate with the central bore 60, concentric with tube 68, extending into the cap from the opposite side. A valve member 76, which is slidably mounted within the integral bushing 73 in the tube 68, terminates in a pointed end 78 which seats on the marginal edge of the opening 60 in the cap to close off the passageway from the inlet 12 to the central portion of the filter. The valve 76 has a blind bore extending from the opposite end thereof in which a coil spring 80 is inserted. A retaining nut 83 is screwed into the tapped opening 72 in the end of the tube 68 to hold the valve 76 in normally closed position by compressing the spring 80. The upper end of the spring (as viewed in Figure 1) seats within the recess 81 provided in the retaining nut 83. By turning the nut 83 downwardly into the threaded opening 72, the spring 80 may be compressed to increase the force required to open valve 76. In this way, the pressure at which the valve will open may be adjusted. The valve, therefore, serves as a safety device to provide relief in the event that the filter media for some reason or another becomes obstructed and the pressure within the filter rises above a predetermined maximum value regulated by the force imposed on the spring 80. When this maximum pressure is reached, the valve 76 moves upwardly (as viewed in Figure 1) so that fluid may flow through passages 58, into the bore 60, and out the circumferentially spaced holes 70 drilled through the wall of the tube 68. It will be seen that the fluid is now on the inside of the filter unit 30 and is free to flow axially through the filter and out the outlet 18.

Another retainer nut 85 is adapted to screw into the threaded opening 72 over the nut 83. The nut 85 has a central bore which is tapped and adapted to receive the threaded end of tie rod or tube 82. Tie rod 82 is made from a tube having several circumferentially spaced rows of openings 84 adapted to permit fluid to flow therethrough. The opposite end of the tie rod 82 has a flange 86 which seats on an inturned flange 19 within the outlet opening 18. The tie rod supports the inner end of the tubular valve housing 68 projecting from the cap 54 to provide a rigid assembly. A pair of lock nuts 88 are adapted to screw into the threaded outlet opening 18 to secure the tie rod at that end. The nuts 88 have central openings to permit fluid flow therethrough. The structure described to this point comprises the magnetic filter.

If desired, the filter may include a micronic filter cylinder or cartridge 90 which is adapted to fit around the tube 68 and tie rod 82 inside the magnetic filter unit 30. This is a modified micronic filter which meets the United States Army-Navy specification AN–6235–4a. It may be made from paper, metal, or other suitable material. The cartridge is commonly used in filters for hydraulic fluids, and in combination with the magnetic filter unit 30, a dual purpose unit is provided. The unit 30 removes the ferrous particles and the internal cartridge 90 removes the non-magnetic particles which may have passed through the filter media 40. The particles trapped by the unit 30 do not build up on the surface but are absorbed internally as well. Hence, the filter will function for a relatively long period without cleaning. The micronic filter cartridge 90 is of such diameter that the outer circumference thereof lies adjacent the inner edge of the flanges 62 and 64. At the inlet end, the cartridge abuts against a gasket 92 made from suitable oil-resistant rubber. The opposite end of the cartridge 90, which faces the outlet of the filter, has a retaining ring 94 in contact therewith having a step 95 in which an O-ring 96 is seated to prevent the fluid from by-passing the micronic element. The cartridge 90 is made from soft porous material which will distend under pressure and, consequently, it is necessary to provide a helical spring 45 for supporting the inner surface thereof. A coil spring 98 embraces the step 95 and bears against the ring 94 at one end and against the bottom of the groove 22 in the cap 16 at the other end. Thus, when the cap 16 is screwed into the end of the body, spring 98 is compressed to hold the annular cartridge 90 securely against the gasket 92 at its opposite end.

From the foregoing description it becomes apparent that we have provided a filter employing annularly arranged magnets and filtering sections which provide maximum weight and space savings. The magnets are protected from external discharge by the non-magnetic housing. The self-magnetizing annular unit may be removed for cleaning without discharge that normally occurs where the housing completes the circuit. By reason of this annular design most efficient use is made of the stored magnetic energy. By employing a maximum strength magnetic field, the flow path through the filtering section is kept at a minimum, as are the size and weight of the parts.

The operation of the apparatus is believed to be apparent from the foregoing description. Various modifications of the elements described in the construction illustrated in the drawing will be apparent to those who are skilled in the art. It is, therefore, our intention not to limit the invention to the form described other than as necessitated by the scope of the appended claims.

This application is a continuation-in-part of our application Serial No. 543,920, filed October 31, 1955 now abandoned.

We claim as our invention:

1. A magnetic filter for removing magnetizable contaminants from a fluid comprising a cylindrical housing made from non-magnetic material having inlet and outlet openings at opposed ends, an annular self-magnetizing filter unit concentric with said housing comprising a plurality of permanent magnets forming spaced segments of said annular unit with gaps therebetween, the gaps between said spaced segments being filled with minute irregular-shaped magnetizable particles to form a complete magnetic circuit circumferentially of the filter, and means disposed within said housing to direct the flow of said fluid radially through said gaps.

2. A magnetic filter for removing magnetizable contaminants from a fluid comprising a non-magnetic cylindrical housing having inlet and outlet openings at opposed ends, an annular filter unit concentric with said housing comprising a plurality of spaced permanent magnets forming diametrically opposed segments of said unit, the gaps between said segments being filled with minute irregular-shaped magnetizable particles confined within spaced screens of non-magnetic material to form a complete magnetic circuit circumferentially of the filter, means defining a cap over the end of said filter unit facing said inlet to divert the flow of said fluid to the annular space formed between said filter unit and said housing, thus causing the fluid to pass through said gaps in a radial direction toward the center of said housing.

3. The filter of claim 2 wherein said magnetizable particles are of suitable size to pass a 40 mesh sieve and be retained on a 60 mesh sieve.

4. A magnetic filter for removing magnetizable contaminants from a fluid comprising a non-magnetic cylindrical housing having inlet and outlet openings at opposed ends, an annular filter unit concentric with said housing comprising two permanent magnets forming diametrically opposed quadrants of said unit, the gaps between said quadrants being filled with minute irregular-shaped magnetizable particles confined within spaced screens of non-magnetic material, helical springs adjacent the inner and outer surfaces of said annular filter unit to reinforce said screens, means defining a cap over the end of said filter unit facing said inlet to divert the flow of said fluid to the annular space forming between said filter unit and said housing, thus causing the fluid to pass through said gaps in a radial direction toward the center of said housing.

5. A magnetic filter for removing magnetizable contaminants from a fluid comprising a non-magnetic housing having inlet and outlet openings at opposed ends, an external annular filter unit for trapping magnetizable contaminants concentric with said housing comprising two permanent magnets forming diametrically opposed quadrants of said annular unit, the gaps between said quadrants being filled with minute irregular-shaped magnetizable particles, an internal annular filter cartridge disposed within said external filter unit for trapping contaminants of non-magnetic material, and means within said housing to direct the flow of fluid radially through said gaps and through said internal filter unit.

6. A magnetic filter for removing magnetizable contaminants from a fluid comprising a non-magnetic cylindrical housing having inlet and outlet openings at opposed ends, an annular filter unit concentric with said housing comprising two permanent magnets forming diametrically opposed quadrants of said unit, the gaps between said quadrants being filled with minute irregular-shaped magnetizable particles, having a mean diameter permitting passage through a 40 mesh sieve and retention on a 60 mesh sieve, confined within spaced screens of non-magnetic material, said filter unit being sealed against the housing at the outlet end and spaced from the housing at the inlet end, a cap over the end of said filter unit facing the inlet opening for directing the flow of fluid into the annular space between the filter unit and the housing, thus causing fluid flow through the gaps radially toward the center of the filter, an opening through said cap to provide a by-pass extending axially through the housing to said outlet, and a relief valve disposed within said opening adapted to open upon subjection to a predetermined maximum pressure.

7. A magnetic filter for removing magnetizable contaminants from a fluid comprising a non-magnetic cylindrical housing having inlet and outlet openings at opposed ends, an annular filter unit concentric with said housing comprising two permanent magnets forming diametrically opposed quadrants of said unit, the gaps between said quadrants being filled with minute irregular-shaped magnetizable particles, having a mean diameter permitting passage through a 40 mesh sieve and retention on a 60 mesh sieve, confined within spaced screens of non-magnetic material, said filter unit being sealed against the housing at the outlet end and spaced from the housing at the inlet end, a cap over the end of said filter unit facing the inlet opening and rising to a point concentric with said inlet opening for directing the fluid flow radially outward to the annular space between the filter unit and the housing, a plurality of openings disposed around said point connecting to a central bore in the opposite side of the cap to provide a by-pass extending axially through the housing to said outlet, a relief valve within said bore adapted to open upon subjection to a predetermined maximum pressure.

8. The filter of claim 7 wherein said relief valve has a tubular housing formed integrally with said cap.

9. The filter of claim 7 wherein said relief valve has the end opposite said bore supported by a perforated axially extending tube connecting to said outlet opening.

10. A magnetic filter for removing magnetizable contaminants from a fluid comprising a cylindrical housing having inlet and outlet openings at opposed ends, an annular filter unit concentric with said housing comprising a plurality of permanent magnets forming equally spaced segments of said annular unit, the gaps between said segments being filled with minute irregular-shaped magnetizable particles to form a complete magnetic circuit circumferentially of the filter, and means disposed within said housing to direct the flow of said fluid radially through said gaps.

11. A magnetic filter for removing magnetizable contaminants from a fluid comprising a cylindrical housing made from non-magnetic material having inlet and outlet openings at opposed ends, an annular filter unit concentrically disposed within said housing comprising a plurality of permanent magnets forming spaced segments of said annular unit with gaps therebetween, said gaps being filled with a porous layer of magnetizable metal to form a complete magnetic circuit circumferentially of the filter, and means disposed within said housing to direct fluid flow radially through said gaps and normal to the lines of magnetic flux.

12. A magnetic filter for removing magnetizable contaminants from a fluid comprising a cylindrical housing made from non-magnetic material having inlet and outlet openings, an annular filter unit concentrically disposed within said housing comprising a plurality of permanent magnets forming spaced segments of said annular unit with gaps therebetween, said gaps being filled with a porous layer of magnetizable metal to form a complete magnetic circuit circumferentially of the filter, and means disposed within said housing to direct fluid flow radially through said gaps and normal to the lines of magnetic flux.

References Cited in the file of this patent
UNITED STATES PATENTS

| | | |
|---|---|---|
| 531,183 | Harris | Dec. 18, 1894 |
| 2,490,635 | Kisch | Dec. 6, 1949 |
| 2,838,179 | Thomas | June 10, 1958 |